Patented June 28, 1932

1,864,531

UNITED STATES PATENT OFFICE

HENRY DREYFUS, OF LONDON, AND WALTER BADER, OF SPONDON, NEAR DERBY, ENGLAND, ASSIGNORS TO CELANESE CORPORATION OF AMERICA, A CORPORATION OF DELAWARE

MANUFACTURE OF ACETIC ACID AND METHYL ACETATE

No Drawing. Original application filed September 27, 1926, Serial No. 138,116, and in Great Britain July 20, 1926. Divided and this application filed March 15, 1929. Serial No. 347,448.

This invention relates to the manufacture of acetic acid and other aliphatic compounds and is divided from our copending application S. No. 138,116.

The specification accompanying U. S. patent application S. No. 112,166 of Henry Dreyfus describes catalytic processes for the synthetic production of acetic acid from mixtures of carbon monoxide and hydrogen by subjecting the said mixtures to the action of heat in the presence of catalysts capable of forming acetates which split off acetic acid or both acetic acid and acetone at elevated temperatures not exceeding 450° C.

The specification accompanying our U. S. patent application S. No. 138,116 describes the production, inter alia, of acetic acid and methyl acetate by the action of carbon monoxide on methyl alcohol in the presence of inorganic acid catalysts. The reaction can be expressed by the equation:—

$$CO + CH_3OH = CH_3COOH$$

According to the prevailing conditions, the acetic acid formed may be obtained either in the free state or in the form of the ester formed by condensation with the methyl alcohol present in the reaction chamber.

We have now also found, and this forms the basis of our invention, that acetic acid and methyl acetate can be obtained directly, that is without isolating any intermediate product, by passing a mixture containing carbon monoxide and hydrogen in the requisite proportions over an inorganic acidic catalyst containing a radicle of an oxy acid in which a hydroxyl is directly linked to a non-metallic element. For the sake of brevity, this catalyst will be referred to hereinafter in the specification as an "inorganic acidic catalyst". In this case, the reaction can be regarded as taking place in two stages involving the production of methyl alcohol and the simultaneous transformation of the methyl alcohol into acetic acid, or may be represented more simply as occurring in a single stage according to the following equation:—

$$2CO + 2H_2 = CH_3COOH$$

We may however allow the reaction to take place in two stages, that is to say, the mixture containing carbon monoxide and hydrogen may first be subjected to the action of heat and pressure in the presence of a methanol forming catalyst such as zinc oxide. The resulting products are then led, without cooling, directly to a chamber containing an inorganic acidic catalyst for conversion into acetic acid. When the reaction is effected in two stages in this manner it is not necessary to have the whole of the carbon monoxide present in the initial gas mixture, as part of it may be introduced into the gas stream immediately before the latter is subjected to the action of the inorganic acidic catalyst.

Preferably the reaction is carried out at temperatures between about 200° and 450° C. and under pressure. The pressure may be as high as 50, 100, 200 or 300 atmospheres or any higher pressure that can conveniently be attained in practice, but when the gaseous mixture containing carbon monoxide and hydrogen is subjected only to the action of an inorganic acidic catalyst the pressure is preferably on the higher side, for instance from about 150 to 300 atmospheres or more.

Preferably an inorganic acidic catalyst that is non-volatile or only very slightly volatile under the conditions of the reaction is used. It is desirable that the catalyst should not be reduced or otherwise chemically changed during the reaction into a non-acid or volatile body. Particularly good results are obtained with the acids derived from phosphorus, and especially the phosphoric acids, for instance, ortho, pyro or meta phosphoric acid, or mixtures of these acids. Boric acid, arsenic, and phosphomolybdic acid are also suitable for use as catalysts. Mixtures containing two or more of the aforementioned catalysts may also be employed.

When acids are used as catalysts, they may be partially neutralized to form acid salts if desired, though only to such an extent that the resulting body, at the temperature of the reaction, still contains free hydroxyl groups according to the usual formulation. A partial neutralization of the acid is particularly advantageous in cases where it is desired to reduce the volatility of the acid or to convert it into the solid form. For instance, we may use a compound which may be regarded as consisting of one molecule of a monovalent base, or its equivalent of a polyvalent base, in combination with more than one molecule of ortho phosphoric acid, so that the resulting complex phosphorous derivative is still acid at temperatures between 300° and 400° C., or other temperature used in the reaction. Thus, for instance, in accordance with the present invention, an acid aluminium phosphate of the composition $Al_2O_3.12H_3PO_4$ may be employed as catalyst.

The catalyst used may be in the liquid state, as in the case of phosphoric acid, or in the solid state, as in the case of boric acid or acid aluminium phosphate, at the temperature of the reaction, and may be distributed over or supported on an inert solid carrier, for example, coke, graphite, etc. The catalysts may be charged into the reaction chamber before the beginning of the operation, or may be added during the operation, for example, as a spray of a liquid catalyst, or in some cases in the form of vapour of a volatile ester, for instance a methyl ester, which is decomposed under the conditions of the reaction to yield an inorganic acidic catalyst, or may be introduced into or generated in the reaction chamber in any other way.

The carbon monoxide-hydrogen gas mixtures can be employed either as such or in the form of industrial or other mixtures containing inert gases, for example, nitrogen, methane, etc. Thus, we may use water gas, producer gas or coke oven gas, after adjustment, if necessary, of the proportions of carbon monoxide and hydrogen contained therein.

The acetic acid formed may be obtained either in the free state or in the form of the methyl ester which is formed by condensation of the acetic acid with methyl alcohol formed in the reaction chamber. If however water is present in sufficient quantities, acetic acid is in general obtained, while mixtures of acetic acid and methyl acetate in various proportions can be obtained in accordance with the conditions adopted.

If the operation is so conducted as to produce substantial quantities of methyl acetate, the methyl acetate so obtained may be easily saponified and worked up into acetic acid and methyl alcohol or dimethyl ether.

The process can be carried into effect in many different ways, and we do not restrict our invention to the following examples of forms of apparatus and methods of procedure, said examples being given by way of explanation and being in no way limitative in character.

According to one method of performing the invention, we use a closed train of apparatus comprising a gas circulating pump, which drives the mixture containing carbon monoxide and hydrogen through a heat exchanger into the reaction chamber. The products issuing from the reaction chamber pass through the heat exchanger to a condenser provided with a receiver, in which the uncondensable gases are separated from the liquid products. The liquid products are withdrawn and the gases are returned to the gas circulating pump. This circuit may be supplemented by pressure gauges, traps for acid, preheaters, flow meters, temperature controls, and so on.

The reaction chamber may contain any device which will bring the gas well into contact with the catalyst. For instance in case of a liquid the gases may be bubbled through the liquid or the reaction chamber may be arranged as a washing column, or it may be fitted with agitators, or it may be rotary, and if desired provided with carrier material for the liquid. If the catalyst be a solid, or a liquid spread on a solid carrier, it is advantageously used in granular form. It is preferable to employ a large mass of a liquid catalyst.

Both the catalyst and the gases should be reasonably free of such impurities as would neutralize the acid.

The different parts of the apparatus are preferably protected against corrosion by acids and carbon monoxide. Thus, for example, it is preferable to avoid the exposure of the gases to the action of iron in the system, although special alloys that will not form iron carbonyl can be used with advantage. The vessels containing or in contact with acids are preferably suitably protected, according to the kind of acid present. For instance, the parts in contact with acetic acid may be made of, or lined with, copper, while those containing phosphoric acid may have a lining of graphite or gold, or may be made of, or lined with copper. In using copper in contact with phosphoric acid it is preferable to prevent the access of oxygen to the apparatus.

The following examples illustrate some technical applications of our process, but as will be understood the invention is not limited in any way thereto.

Example 1

Purified water gas is compressed to 250–300 atmospheres and after bubbling through water at a temperature of about 100–150° C. is passed through a chamber maintained at a temperature of about 280° C.–400° C. and filled with coke or other inert porous material that has been impregnated with phosphoric acid, or through a slowly rotating chamber which is about one third filled with phosporic acid and is filled with graphite, pebbles, or other materials presenting an extended surface. The products are condensed and the uncondensed gases are recirculated by means of a gas-circulating pump, and the condensate is collected and re-distilled to obtain the acetic acid. The nitrogen and other inert gases that accumulate in the system are removed either intermittently or continuously and replaced by fresh supplies of water gas.

*Example 2*

A mixture of about 55–65% by volume of carbon monoxide with about 35–45% by volume of hydrogen is passed under a pressure of about 150–200 atmospheres through a vessel containing zinc oxide and kept at a temperature of about 300–400° C. The resulting mixture containing carbon monoxide and methyl alcohol vapour is passed without cooling over an acid catalyst maintained at about 300–400° C. The reaction products are separated and the uncondensable gases are returned for re-circulation through the system.

As previously stated, the process may be directed to the manufacture of methyl acetate as practically sole product of the reaction. In this case, if acetic acid is desired as ultimate product, the methyl acetate is saponified.

This method of operation is of particular interest since we have found it possible to control the saponification of esters of organic acids in such manner as to produce the free acids in an anhydrous condition. For this purpose the saponification is effected by means of just the theoretical amount of water required for the reaction, a strong mineral acid, for example, phosphoric acid or sulphuric acid, being preferably used as saponifying agent.

The reaction proceeds according to the following equation:—

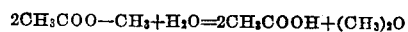

It is preferred to use phosphoric acid as saponifying agent, since it does not act as an oxidizing agent at the temperature employed. The reaction takes place at temperatures between about 150° and about 300° C., temperatures between 180° and 220° C. being especially advantageous. For instance, at 200° C. the reaction proceeds rapidly, and results in substantially a quantitative yield.

The more highly hydrated forms of phosphoric acid, for instance ortho phosphoric acid and pyrophosphoric acid, are capable of supplying the water required for the saponification, being themselves at the same time dehydrated to the form of meta phosphoric acid. It is therefore possible to perform the reaction in a continuous manner, by continuously introducing supplies of ester and water in the requisite proportions into the phosphoric acid, the phosphoric acid serving in effect as a carrier for the water.

The saponification may be carried out in any apparatus designed for the interaction of gas and liquids, for example, wash towers, mixers, bubblers etc.

The saponification of the methyl acetate may be carried out continuously with its production. Thus for instance a mixture of carbon monoxide and hydrogen may be passed under pressure over phosphoric acid at 300°–400° C., and the products of reaction containing methyl acetate, preferably expanded to lower pressures, for instance, atmospheric pressure are passed together with the requisite quantity of steam through a chamber containing phosphoric acid maintained at lower temperatures, for example, 180°–250° C.

The process for the saponification of methyl acetate so as to obtain concentrated acetic acid forms the subject matter of our co-pending application S. No. 295,611.

The invention is not limited to any of the particular embodiments, whether of the main reaction or of the subsidiary reactions, herein described, but may be performed by any other methods falling within the scope of the following claims.

It is to be understood that though certain ranges of temperature and other conditions are hereby mentioned as those preferred for use with certain catalysts the invention is not limited in these respects. The temperatures used in any particular case are preferably those which are found by experience to give a maximum yield of acetic acid or methyl acetate with a minimum amount of undesirable by-products. Thus if a catalyst that is decomposable at high temperatures is employed, for instance a strong inorganic acid substance containing organic groups, the reaction is conducted at suitably lower temperatures and at appropriate conditions of pressure etc. so as to prevent or minimize modification of the catalyst to an inactive form.

What we claim and desire to secure by Letters Patent is:—

1. Process for the manufacture of compounds containing an acetyl group, which comprises subjecting a gaseous mixture containing carbon monoxide and hydrogen to the action of an inorganic acidic catalyst containing a radicle of an oxy acid in which a hydroxyl is directly linked to a non-metallic element.

2. Process for the manufacture of compounds containing an acetyl group, which comprises subjecting a gaseous mixture containing carbon monoxide and hydrogen at temperatures between about 200° and about 450° C. and under superatmospheric pressure to the action of an inorganic acidic catalyst containing a radicle of an oxy acid in which a hydroxyl is directly linked to a non-metallic element.

3. Process for the manufacture of compounds containing an acetyl group, which comprises subjecting a gaseous mixture containing carbon monoxide and hydrogen to the action of a phosphoric acid at temperatures between about 200° and about 450° C. and under super-atmospheric pressure.

4. Process for the manufacture of compounds containing an acetyl group, which comprises subjecting a gaseous mixture containing carbon monoxide and hydrogen to the action of pyro-phosphoric acid at temperatures between about 200° and about 450° C. and under super-atmospheric pressure.

5. Process for the manufacture of compounds containing an acetyl group, which comprises subjecting a gaseous mixture containing carbon monoxide and hydrogen to the action of a phosphoric acid at temperatures between about 200° and about 450° C. and under pressure of more than 100 atmospheres.

6. Process for the manufacture of acetic acid, which comprises subjecting a gaseous mixture containing carbon monoxide and hydrogen, together with water vapor, to the action of an inorganic acidic catalyst containing a radicle of an oxy acid in which a hydroxyl is directly linked to a non-metallic element.

7. A process for the manufacture of acetic acid which comprises subjecting a gaseous mixture containing carbon monoxide and hydrogen together with water vapour to the action of a phosphoric acid at temperatures between about 200° and 450° C. and under super-atmospheric pressure.

8. A process for the manufacture of acetic acid which comprises subjecting a gaseous mixture containing carbon monoxide and hydrogen together with water vapour to the action of a phosphoric acid at temperatures between about 280° and 400° C. and under pressure of 200 to 300 atmospheres.

9. A process for the manufacture of acetic acid which comprises subjecting a gaseous mixture containing carbon monoxide and hydrogen to the action of an inorganic acidic catalyst containing a radicle of an oxy acid in which a hydroxyl is directly linked to a non-metallic element and converting the methyl acetate content of the reaction product into free acetic acid.

10. A process for the manufacture of acetic acid which comprises subjecting a gaseous mixture containing carbon monoxide and hydrogen to the action of a phosphoric acid and converting the methyl acetate content of the reaction product into free acetic acid by saponification in the presence of substantially the quantity of water necessary for the production of glacial acetic acid.

11. A process for the manufacture of acetic acid which comprises subjecting a gaseous mixture containing carbon monoxide and hydrogen to the action of a phosphoric acid and converting the methyl acetate content of the reaction product into free acetic acid by saponification in the presence of substantially the quantity of water necessary for the production of glacial acetic acid and dimethyl ether.

12. A process for the manufacture of acetic acid which comprises subjecting a gaseous mixture containing carbon monoxide and hydrogen to the action of a phosphoric acid and converting the methyl acetate content of the reaction product into free acetic acid by saponification with a strong mineral acid in the presence of substantially the quantity of water necessary for the production of glacial acetic acid and dimethyl ether.

13. A process for the manufacture of acetic acid which comprises subjecting a gaseous mixture containing carbon monoxide and hydrogen to the action of a phosphoric acid and converting the methyl acetate content of the reaction product into free acetic acid by saponification with a phosphoric acid in the presence of substantially the quantity of water necessary for the production of glacial acetic acid and dimethyl ether.

14. A process for the manufacture of acetic acid which comprises subjecting a gaseous mixture containing carbon monoxide and hydrogen to the action of a phosphoric acid and converting the methyl acetate content of the reaction product into free acetic acid by saponification with a phosphoric acid at temperatures between about 150° and 300° C. in the presence of substantially the quantity of water necessary for the production of glacial acetic acid and dimethyl ether.

In testimony whereof we have hereunto subscribed our names.

HENRY DREYFUS.
WALTER BADER.